United States Patent
Kajiya (10) Patent No.: US 8,365,142 B2
(45) Date of Patent: Jan. 29, 2013

(54) HYPERGRAPH IMPLEMENTATION

(75) Inventor: James T. Kajiya, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 898 days.

(21) Appl. No.: 12/484,674

(22) Filed: Jun. 15, 2009

(65) Prior Publication Data

US 2010/0318963 A1 Dec. 16, 2010

(51) Int. Cl.
*G06F 9/44* (2006.01)
(52) U.S. Cl. .................... 717/106; 717/104; 717/105
(58) Field of Classification Search .................. None
See application file for complete search history.

(56) References Cited

U.S. PATENT DOCUMENTS

| | | | | |
|---|---|---|---|---|
| 4,479,196 | A * | 10/1984 | Ferrer et al. | 717/105 |
| 6,973,642 | B2 * | 12/2005 | Minemoto | 717/106 |
| 2003/0037319 | A1 * | 2/2003 | Narang | 717/104 |
| 2004/0090439 | A1 * | 5/2004 | Dillner | 717/104 |
| 2004/0133536 | A1 * | 7/2004 | Uceda-Sosa | 717/106 |
| 2007/0044084 | A1 * | 2/2007 | Wang et al. | 717/105 |
| 2010/0023924 | A1 * | 1/2010 | Meijer et al. | 717/106 |

OTHER PUBLICATIONS

Guido Moerkotte, Dynamic Programming Strikes Back, 2008, ACM, 14 pages, <URL: http://delivery.acm.org/10.1145/1380000/1376672/p539-moerkotte.pdf>.*
Michelle Mills Strout, Metrics and Models for Reordering Transformations, 2004, ACM, 12 pages, <URL: http://delivery.acm.org/10.1145/1070000/1065899/p23-stroutpdf>.*
Zhifei Li, First and Second-Order Expectation Semirings with Applications to Minimum-Risk Training on Translation Forests, 2009, ACM, 12 pages, <URL: http://delivery.acm.org/10.1145/1700000/1699517/p40-Ii.pdf>.*
Lijun Li, A design-driven partitioning algorithm for distributed verilog simulation, 2007, ACM, 8 pages, <URL: http://delivery.acm.org/10.1145/1250000/1249026/28980211.pdf>.*
Stefan Rieger, Abstracting Complex Data Structures by Hyperedge Replacement, 2008, Google Scholar, 15 pages, <URL: http://www.springerlink.com/content/y56n187k58v05x71/fulltext.pdf>.*
Sebastian Seifer, Parsing String Generating Hypergraph Grammars, 2004, Google Scholar, 16 pages, <URL: http://www.springerlink.com/content/u5dnd12ex0mw63hq/fulltext.pdf>.*
"3.3.3 Ghosting", retrieved on Jul. 22, 2009 at <<http://msdn.microsoft.com/en-us/library/dd357039(PROT.13,printer).aspx>>, Microsoft Corporation, 2009, 1 page.
"Hypergraph", retrieved on Jul. 22, 2009 at <<http://en.wikipedia.org/wiki/Hypergraph>>, Wikipedia, May 7, 2009, pp. 1-7.

(Continued)

*Primary Examiner* — Thuy Dao
*Assistant Examiner* — Hua Lu
(74) *Attorney, Agent, or Firm* — Lee & Hayes, PLLC (57) ABSTRACT

A hypergraph implementation system is described. The hypergraph implementation system provides for a hypergraph template library that contains many hypergraphs and many bulk data areas. The hypergraphs allow a developer to program an application such that the pointers to files are contained in the memory cache. The hypergraphs consist of hyperedges and vertices residing in tables of indices that point into each other in a flat organization. Bulk data is hung directly off hyperedges and vertices via a set of features. Thus, all the relationships among objects are contained within the hypergraphs and all the bulk data such as audio, large tables, geometry and images are directly tied to hyperedges or vertices with one link.

20 Claims, 5 Drawing Sheets

OTHER PUBLICATIONS

"Hypergraph Implementation", retrieved on Jul. 22, 2009 at <<http://koko.che.caltech.edu/wiki/index.php5/Hypergraph_implementation>>, Sharpen, Jun. 27, 2009, 1 page.

jeremias_werner, "The Hypergraph Algorithm Library", retrieved on Jul. 22, 2009 at <<http://sourceforge.net/projects/hgboost/>>, SourceForge, Inc., 2009, pp. 1-3.

"Metaprogramming", retrieved on Jul. 22, 2009 at <<http://en.wikipedia.org/wiki/Metaprogramming>>, Wikipedia, Jun. 26, 2009, pp. 1-3.

Zhou, et al, "Learning with Hypergraphs: Clustering, Classification, and Embedding", retrieved on Jul. 22, 2009 at <<http://books.nips.cc/papers/files/nips19/NIPS2006_0630.pdf>>, 8 pages.

* cited by examiner

HYPERGRAPH IMPLEMENTATION

BACKGROUND

Object oriented programming has been used extensively by developers for organizing data when writing program code. While object oriented programming has worked relatively well, the advent of multi-core computers and devices has caused significant inefficiencies. Concurrent multi-processing that is required in multi-core devices to optimize performance is not conducive to object oriented programming.

Since the majority of programs currently developed have used object oriented programming, performance in multi-core devices is less than optimal. The memory layout of an object oriented based program would ideally be very compact with all the nodes allocated contiguously. However, this is frequently not the case in large programs, which typically perform many computations, and allocate memory during those computations. The resulting nodes would then be scattered through the heap. The pointers, meanwhile, may subsequently point to locations very far away rather than to locations that are a short distance away.

In the past, this memory allocation behavior would not have been troubling, since following a memory pointer was cheap. However, over the decades processor speeds have been increasing by 60% per year and memory access speeds by 15% per year, according to some estimations. As such, early computers could follow hundreds or thousands of pointers in the time it took to do one floating point operation. Today, the opposite situation exists. That is, following a pointer that goes to memory can have a cycle time that is equivalent to hundreds if not a thousand floating point operations. Consequently, modern computer architectures have constructed complex memory hierarchies, with Level one (L1), Level two (L2) and Level three (L3) caches to mitigate the speed differential.

The situation is exacerbated by multi-core processors, which include multiple unshared caches at the L1 and L2 level and a shared L3 cache. The issue of cache management for synchronization and interference becomes a vital task, which can affect total performance in significant ways.

Memory hierarchies only work if memory references statistically tend to be local. That is, a memory address should be close to past memory addresses so that both locations will fit into some cache line. High-performance data structures are ones that support algorithms where highly local access behaviors predominate.

With object oriented programming, the memory behavior locality is purely determined by chance. Many programming languages (most notably C and C++) allow one to control the memory allocation of objects so that with enough programming effort one can gain locality. This effort is large enough that most programmers will not undertake this exercise except in critical situations. Indeed, object oriented programming and many of its programming patterns encourage the construction of programs where application data is broken up into small pieces (objects are typically a few dozen or so bytes), with the entire structure threaded together with global pointers. If these objects happen to be contiguous, then the program performs well. If not, however, then one must go to the effort to make them so.

Consequently, there are many shortcomings in the current programming methods and there is a need for a new approach to programming data structures.

SUMMARY

A hypergraph implementation system is described. The hypergraph implementation system provides for a hypergraph template library that contains many hypergraphs and many bulk data areas. The hypergraphs allow the developer to program an application such that the pointers to bulk data areas are contained in the memory cache. The hypergraphs consist of hyperedges and vertices residing in tables of indices that point into each other in a flat organization. These pointers are local indexes that are small in size and fit into fast memory caches, precluding the need to follow general pointers into main memory and mitigating cache misses.

Bulk data is hung directly off hyperedges and vertices via a set of features. Thus, all the relationships among objects are contained within the hypergraphs and all the bulk data such as audio, large tables, geometry and images are directly tied to hyperedges or vertices with one link. Because the tables in a hypergraph are small, all pointer chasing will usually occur within the Level one (L1) and Level two (L2) caches. A single pointer can then be followed to the bulk data in main memory, where data parallel operations may be used to process the bulk data.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

This document describes techniques for using hypergraphs to program applications. Due to the nature of hypergraphs, they can be used for graphics, animation, constraints, representation of computational formulae, relationships between objects within a world, and relationships between worlds. The design is similar to the runtime data organization and representation for a compiler code generator, such as a stack frame layout, call and register conventions, and a data layout one uses for the target of the abstract language data objects.

Hypergraphs provide a way of organizing data such that the use of random global pointers and deep pointer chains is minimized. Hypergraphs may be used to minimize these deep pointer chains by situating as many pointers as possible at the top level. That is, hypergraphs are composed of a set of hyperedges and vertices residing in tables of indices that point into each other in a flat organization. These pointers are local indexes directed to small data tables. This allows each pointer to be one or two bytes each so that entire hypergraphs may easily be allocated on the stack or on the heap.

By using a set of small tables holding small entries, most hypergraphs fit nicely into fast caches, precluding the need to follow general pointers into main memory. This structure mitigates the likelihood of causing a cache miss which requires significant additional resources. Bulk data is hung directly off hyperedges and vertices via a set of features, attributes, or properties.

Illustrative Architecture

Figure 1:
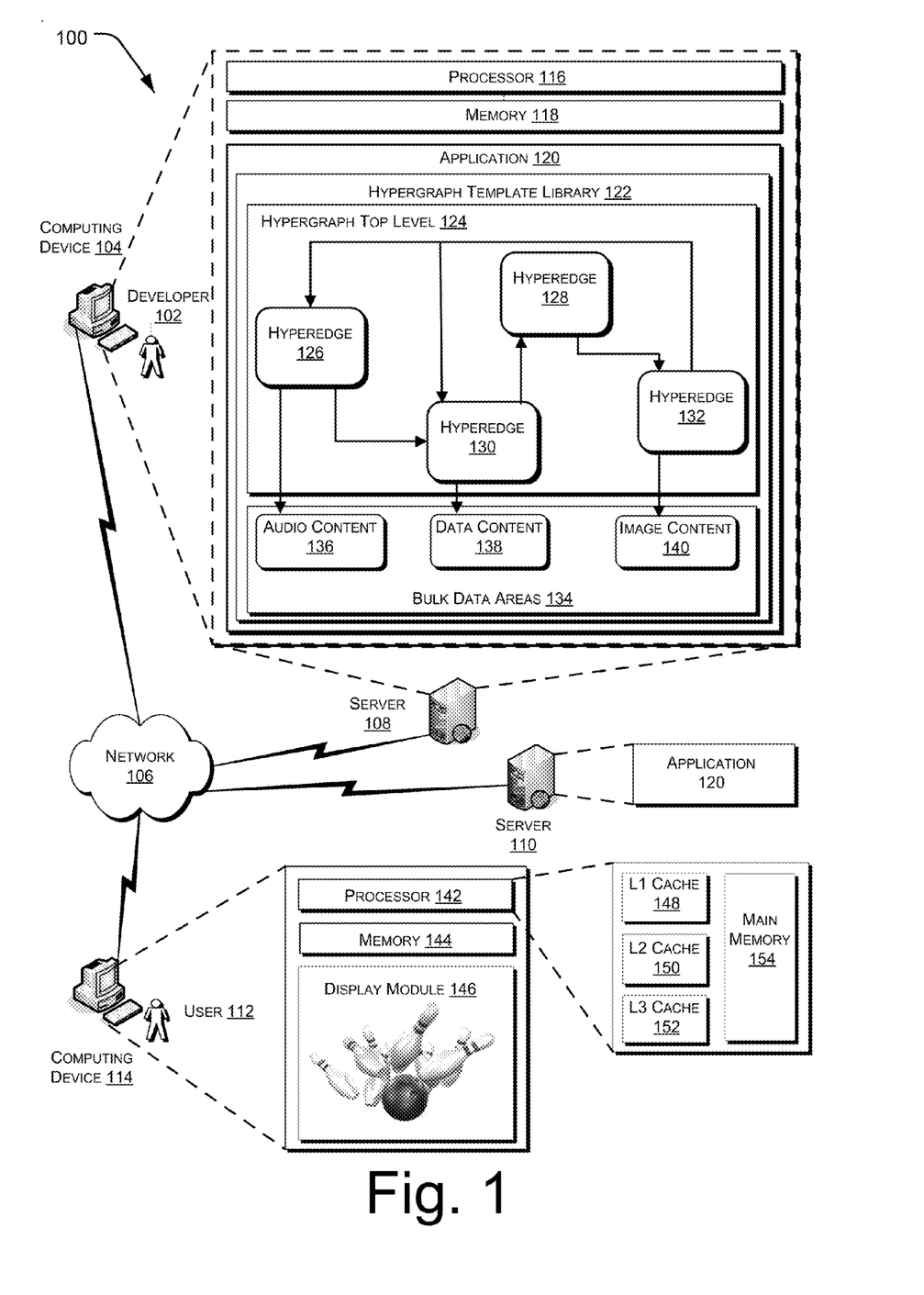
FIG. 1 depicts an illustrative architecture for hypergraph implementation.

FIG. 1 depicts an illustrative architecture for hypergraph implementation. As illustrated, the architecture 100 includes a developer 102 and a computing device 104. Developer 102 utilizes the computing device 104 to write and develop programming applications. While the applications may be written for any type of computing device, the techniques for writing applications described herein are particularly useful for multi-core computing devices. Computing device 104 may comprise a personal computer, a mobile phone, a personal digital assistant (PDA) or any other similar or different device.

Computing device 104 may be connected to a network 106 to provide storage and connectivity to other devices. Server 106 may also be connected to network 106 for writing an application 120 and server 108 may be connected to the network to store an application 120. User 112 and computing device 114 may be connected to the network to run an application, such as application 120 written by developer 102 and, once written, stored on server 108, another server 110 or in any other suitable location.

Computing device 104 contains processor 116 and memory 118. Application 120 is developed on computing device 104. Development of application 120 uses hypergraph template library 122. Hypergraph template library 122 includes a hypergraph top level 124, which includes a number of hyperedges 126, 128, 130 and 132. The hyperedges 126, 128, 130 and 132 point to a number of bulk data areas 134 that may include audio content 136, data content 138, image content 140 or any other type of content that developer 102 wishes to include as a part of application 120.

A description of hypergraphs is pertinent at this point. All technical disciplines illustrate complex ideas through graphical diagrams. Many times these diagrams are not merely evocative illustrations but correspond to precise formation rules that effectively make them presentations of abstract data structures. Such precise graphical diagrams are captured by the formal notion of a hypergraph.

A hypergraph is a data structure composed of vertices or nodes (also known as scalars, states, places, individuals, nets, or sites) and hyperedges (also known as hyperarcs, transitions, components, rows, tuples, or frames) that connect nodes. This connection is usually represented as a tuple of nodes. Each entry in this tuple is a tentacle (also known as a port, a pin, a field, an attribute, or a slot) of the hyperedge.

We implement hypergraphs as a set of hyperedges and vertices residing in tables of indices that point into each other in a flat organization. These pointers are local indexes into small data tables that allow them to be as small as one or two bytes each so that entire graphs may be allocated on the stack or on the heap. By making the tables small, most hypergraphs fit into fast caches, precluding the need to follow general pointers into main memory. This concept also mitigates the chances of causing a cache miss. A cache miss requires significant additional resources to run since the pointer has to go out to main memory, run additional operations and return to the cache with the proper information. When data is scattered throughout the memory and global pointers are used to tie the data together, the systems rarely run fast and performance often suffers.

Ordinary graphs are reducts of hypergraphs in that a graph is a hypergraph with all its hyperedges having only two tentacles (head and tail) connecting, to exactly two vertices. A general hypergraph may connect none, one, two, or more than two vertices.

Like ordinary graph edges, hyperedges are directed, meaning that its tentacles are ordered. In addition, hyperedges have a definite degree and may have a signature and/or attributes. In contrast, vertices impose no order on the hyperedges incident upon it, nor do they constrain their in- or out-degrees. Likewise there is no limitation on the signature of hyperedges that may be incident upon a vertex. Vertices that hold data are called carrier vertices and the data stored within them are called dataflows.

Returning now to FIG. 1, the hypergraph template library 122 is used by developer 102 to write an application 120 using hypergraphs 124 instead of the typical object oriented programming that has been used frequently in programming applications. In object oriented program, the nodes are typically scattered through the heap and the pointers, rather than pointing a short distance away, may point to locations very far away. In the past, this was not a problem since earlier computing devices could follow hundreds or thousands of pointers in the time it took to do one floating point operation. With today's computing devices, following a single pointer that goes to memory may have cycle times equivalent to hundreds if not a thousand floating point operations. Hypergraphs alleviate this concern. The connectivity information is not spread out among the individual nodes but is pushed up to the top level.

Using hypergraph template library 122, developer 102 organizes the data in a manner consistent with the hypergraph discussion above. That is, developer 102 may organize some or all of the pointers in a flat organization where the pointers are close to each other, small in size and using a much smaller amount of resources. Once the hypergraph top level 122 is organized, a single global pointer or a small number of pointers are directed to a number of bulk data areas 134.

This application development may also be conducted on server 108 through network 106. Server 110 may store the completed application 120 for downloading or use by user 112 through a connection to network 106.

User 112 runs the application 120 on computing device 114. Computing device 114 has a processor 142 and memory 144. Computing device 114 includes personal computers, mobile phones, personal digital assistants (PDAs) and similar devices. Computing device 114 also has a display module 146 for displaying the running of the application 120. The application 120 may be any programming application such as gaming software, business software and the like.

Figure 2:
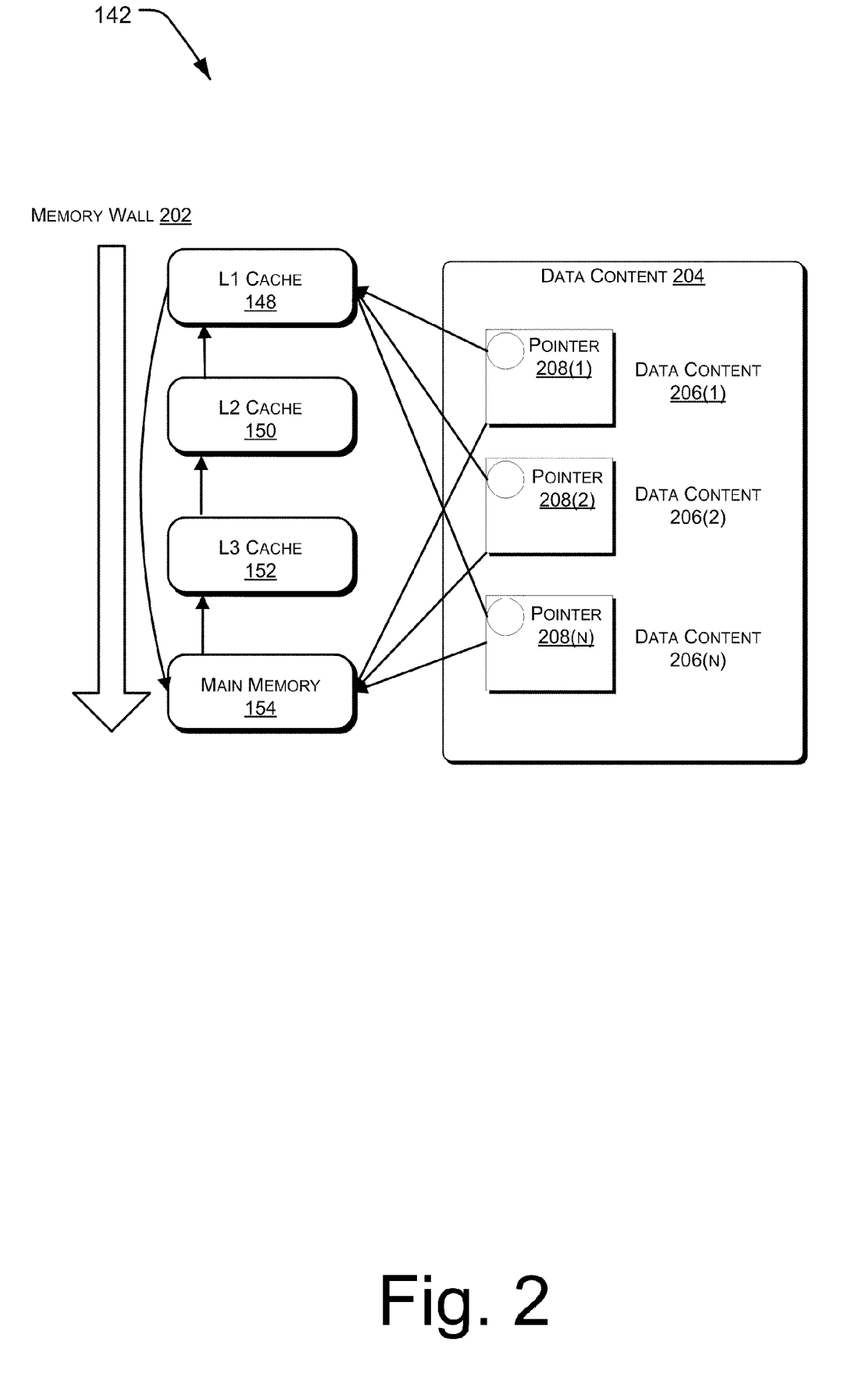
FIG. 2 depicts an illustrative example of one aspect of the processor using the application derived from the hypergraph implementation of FIG. 1.

Processor 142 includes a Level 1 (L1) cache 148, a Level 2 (L2) cache 150, a Level 3 (L3) cache 152 and a main memory 154, as further described in FIG. 2

FIG. 2 illustrates in more detail the processor 142. A memory wall 202 contains L1 cache 148, L2 cache 150, L3 cache 152 and other memory or main memory 154. Typically, as applications are run, the information needed for a particular operation is loaded in cache memory. Since the information is sometimes too large for the L1 cache 148, what does not fit in the L1 cache 148 is stored in the L2 cache 150 and then the L3 cache 152 and finally main memory 154. As the temporary information for each particular operation is stored in successively lower memory levels, the performance suffers when that stored data is accessed by the processor. Data 204 contains a number of data content 206(1), 206(2) ... 206(N) which also contain a number of pointers 208(1), 208(2) and 208(N). Data 204 may include audio, image, text or any other type of data that developer 102 wishes to include as a part of application 120. The pointers 208 are separated from the data content 206 in a hypergraph implementation and the pointers 208 are stored in the L1 cache 148. Since the size is small, in many instances, some, substantially all, or all of the pointers will fit within the L1 cache 148. There may be instances in larger files where the L2 cache 150 and possibly the L3 cache 152 needs to be used to store the pointers. Meanwhile the data content 206 without the pointers 208 is stored in main memory 154. The arrow from the L1 cache 146 to the main memory 154 represents the single pointer resulting from the hypergraph implementation pointing to the bulk data in the main memory 154. As necessary, this bulk data is moved into the L3 cache 152 and possibly the L2 and L1 caches to complete a particular operation.

In order to achieve an even greater efficiency when running an application, the hypergraph's representation is split into two different categories: basic hypergraphs and structure shared hypergraphs. Basic hypergraphs are the atoms from which more complex hypergraphs are constructed, and structure shared hypergraphs are the complex graphs formed from the basic hypergraphs. Basic hypergraphs typically cannot be rewritten while structure shared hypergraphs are optimized to be rewritten. No matter the category of hypergraph, it is always possible to read, process, and rewrite the bulk data stored as features of any hypergraph element. It is only the connectivity that cannot change in a basic hypergraph.

Basic hypergraphs are immutable and, as such, they do not change once they are constructed. There are distinctions between kinds of basic hypergraphs. The first kind are basic hypergraphs that are completely known statically, that is, hypergraphs that can he deduced from the source code at compile time. Because these graphs are known to the compiler, their data need not be allocated anywhere in runtime memory at all.

For these hypergraphs, a technique called ghosting may be used. Ghosting involves removing statically known data and data structures from runtime memory and placing that data within the type system. Ghosting will be discussed in more detail in FIG. 5. Because C++ has a flexible type and type processing system using its template mechanism, ghosting is a particularly effective technique in reducing data cache load since ghosted structures completely disappear from data memory. A ghost basic hypergraph is the first kind of basic hypergraph where all the data is stored in the type system. Of course, there are often times when not all of the immutable basic hypergraphs can be known at compile time. However, it may well be the case that the sizes of various tables may be known statically, which is the second kind of basic hypergraph, called a real basic hypergraph. Finally, when the compiler knows neither the details of the hypergraph, nor its size, for example, an application reads input and constructs such a structure in response to the input, everything needs to be determined at runtime. This is the third kind of basic hypergraph, called a dynamic basic hypergraph.

Mutable hypergraphs form the second category of hypergraphs: a structure shared hypergraph. This type of hypergraph is designed to be constructed from immutable components-basic hypergraphs (ghosted, real, or dynamic) whose structures are to be modified and rewritten to build larger hypergraphs.

The edges and vertices within a hypergraph may have additional data associated with them beyond pure connectivity given by their tentacles. For examples, a hyperedge may be labeled in some way. A hyperedge is labeled by attaching an immutable signature to the hyperedge. This signature may take on different forms but a hypergraph does not have mixed signature types. If it is a labeled hypergraph, all its hyperedges are labeled by a signature of a fixed type. The library provides for three types of signatures: term signatures, box signatures, and rex signatures. If an application needs to create a new type of signature, it may do so by deriving from the signature class. Hypergraphs may also have attributed hyperedges. Each hyperedge is attributed with a feature (or property) that can hold application data of some kind. Such features are not immutable, and may contain arbitrary C++ objects. To obtain the performance benefits of hypergraphs, features that hold unrestricted pointer chains should be avoided. Hypergraphs may also have carrier vertices. Such vertices are associated with objects known as dataflows (or payloads).

Figure 3:
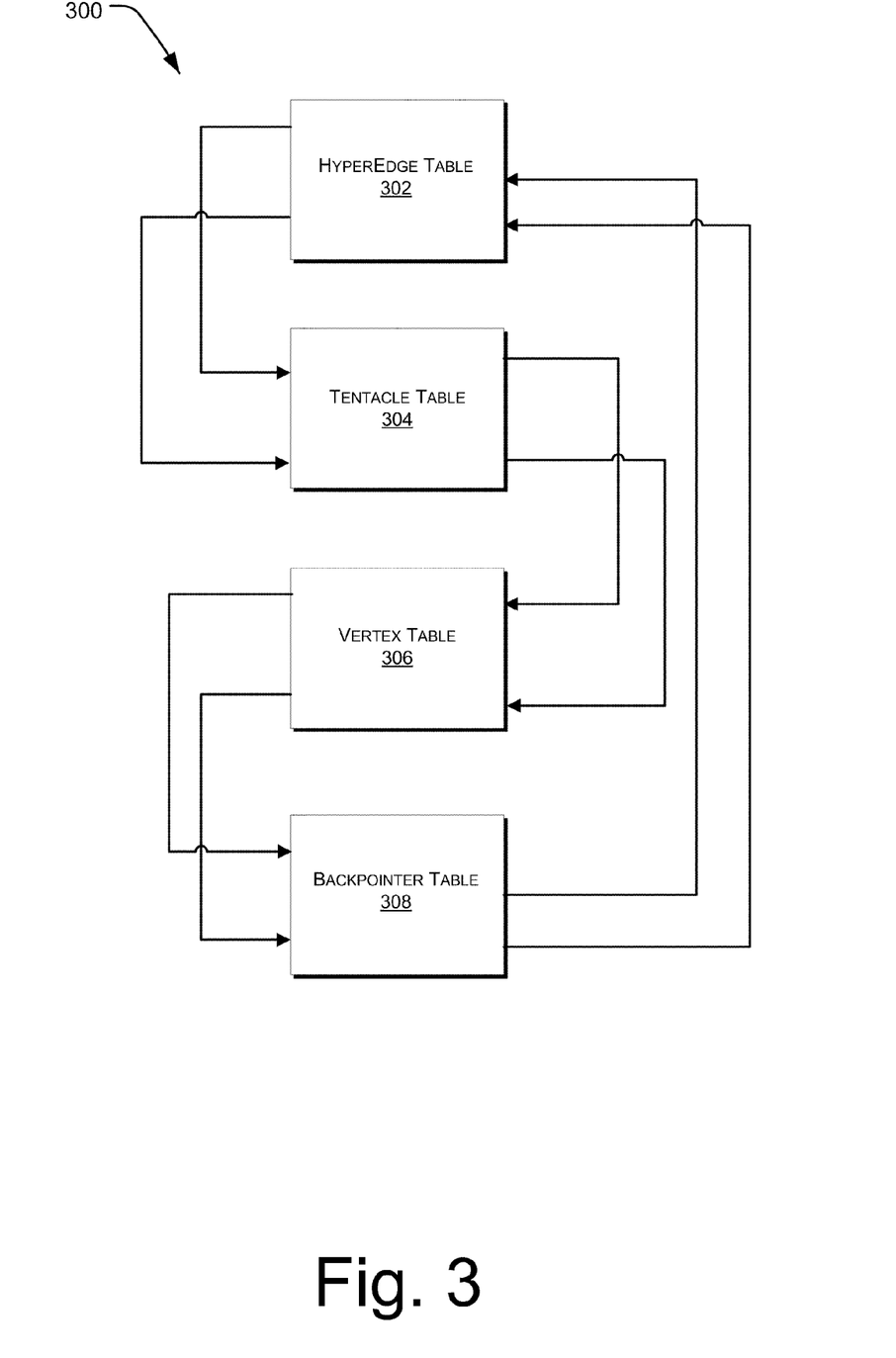
FIG. 3 depicts an illustrative example of the implementation of a basic hypergraph.

FIG. 3 illustrates one implementation of a basic hypergraph 300. The basic hypergraph implementation includes hyperedge table 302, tentacle table 304, vertex table 306 and backpointer table 308. Each hyperedge in the hyperedge table 302 is encoded as an index into the tentacle table 304. The index represents the first entry of a vector of tentacles, each item of which is an index into the vertex table 306. There are no unbound tentacles. A vertex is encoded as an index into the backpointer table 308. The index represents the first entry of a vector of backpointers, each item of which is an index into the hyperedge table 302. There are no unbound backpointers and a hypergraph may point to the same vertex through many different tentacles. A vertex may mention a hyperedge once.

The concrete representation of each index depends on the size of the table it points into. Thus the size of a hyperedge table 302 entry is determined by the total number of tentacles. The size of a tentacle table 304 entry is determined by the number of vertices. The vertex table 306 entry size is determined by the number of backpointers. Finally, the backpointer table 308 entry size is determined by the number of hyperedges.

There are three size of tables which are called large, small and tiny. A large table usually is a size greater than or equal to $2^{16}$ bytes, a small table is of a size greater than or equal to 256 bytes but less than $2^{16}$, and a tiny table is of a size less than 256 bytes.

Hypergraphs may have labeled hyperedges. These labels, also known as signatures, record various characteristics of a hyperedge and its tentacles. Signatures are immutable. There may be several different types of signatures, such as term signatures, box signatures and rex signatures as mentioned earlier and described in more detail below.

A term signature is a label for the output tentacle which is the valence of the term. A box is just another name for a hyperedge. Boxes have-pins or ports instead of tentacles. The box signature has an integer number of pins, a vector of pin labels, a vector of pin senses {in, out} as well as a string label for the hyperedge itself. Rex signatures have three integers specifying the multiplicity, left valence, and right valence of a hyperedge.

Hypergraphs may also have attributed hyperedges. These attributes, also known as features or properties, hold application data for the hyperedge. Features are not immutable. A feature object is usually just a record of data features or perhaps autopointers to larger application data. In order to get the advantages of the hypergraph organization, application data may be plain old data (POD) objects so that it is possible to do aggregate data operations on them. When it is practical to do so, application data that hold unrestricted pointer chains should be avoided.

Hypergraphs may also have carrier vertices. Such vertices are associated with carrier objects, also known as payloads or dataflows. Dataflows hold application data for each vertex. This is usually just a record of data or autopointers to larger application objects. The included objects should also be POD objects.

Labeled, attributed and carrier hypergraphs are basic hypergraphs that inherit from eponymous flavor-like classes in a multiple fashion, each instance of which holds a table with a table of pointers to individual signatures, features or dataflows. For labeled and attributed graphs, the tables are indexed by hyperedges. For carrier hypergraphs, the table is indexed by vertices.

Note that the sizes of the hyperedge, tentacle, vertex, and backpointer (and hence the labeled, attributed, and carrier) tables may be, and usually are, different. Thus basic hypergraphs must be implemented via a generic type parameterized by these sizes.

There are no unused entries in the hyperedge, tentacle, vertex, and backpointer tables. Fundamental operations on basic hypergraphs are constructor/destructor, creating hyperedge/vertex, edge/vertex (wiring up tentacles), cloning the graph to the next larger representation and graphing traversal templates Hypergraphs must be able to live in the heap, on-the-stack, or be ghosted. The abstract basic hypergraph should not need to know the size of the tables, where they are allocated, or whether they are ghosts.

The description above describes what basic hypergraphs are and what they do. The following discussion centers on the methods for creating the various types of basic hypergraphs. There are three methods for creating basic hypergraphs. The first method builds the graph gradually by specifying hyperedges, vertices, and tentacles individually. The second method allows easy construction of hyperedges but requires that vertices be tracked by program. The third method creates the hypergraph all at once from specification of a hypergraph via an array of tentacle tuples. A real basic hypergraph may only be constructed by the first and second method. A ghost basic hypergraph may only be constructed by the third method since it needs to be known at compile time. A dynamic basic hypergraph may be constructed using any of the methods.

In this first example, a basic hypergraph is constructed that has one hyperedge and one vertex with one tentacle connecting them,

```
#include "hypergraph. h"
RealBasicHypergrap~10,10,10,10~ hg1;
unsigned int hej1, vtx1;
unsigned int retCode;
retCode = hg1.mkHyperedge(&hej1);
retCode = hg1.mkVertex(&vtx1);
retCode = hg1.mkTentacle(hej1, vtx1);
```

The first source line declares the variable g1 to be of type RealBasicHypergraph. This is a template expression that takes four parameters giving the sizes of tables used to represent the hypergraph. These tables are sized as follows. The first parameter is a maximum number of hyperedges in the hypergraph. The second parameter is the maximum total sum of tentacles in the hypergraph. The third parameter is the maximum number of vertices in the hypergraph. Finally, the fourth parameter is the maximum total sum of degrees of vertices. With real basic hypergraphs, one must know these numbers at compile time. For example, suppose one is reading in syntax for some DSL and constructing hypergraphs from it. During parsing, it may be useful to partially construct such hypergraphs into a buffer of fixed size that is large enough to accommodate the anticipated inputs. Once that buffer is complete, it may be flushed to the heap and the next source segment read in.

The buffer is an example of a real basic hypergraph because the maximum size of the hypergraph buffer is estimated to be below some statically known bound. Once the hypergraph is constructed in the buffer, the software can interrogate the actual sizes of the tables. The buffer can then be flushed to a dynamic basic hypergraph.

The second line of the example just declares two unsigned integers that will be indices into the hyperedge and vertex table. The third line declares the variable that will hold the return code of the hypergraph calls. A return code of 0 indicates success; a nonzero return code will encode the reasons for failure accordingly. These codes can be found in the descriptions of each call or in the summary table in the appendix. The fourth line makes a new hyperedge in hg1. This call, hg1. mkHyperedge, returns an unsigned int return code which is 0 when the library can allocate a new hyperedge in the graph. A nonzero code is returned when some error has occurred. The error may be that the tables are full and no new hyperedges can be created. The actual hyperedge index created is returned in the first argument. The fifth line makes a new vertex in hg1. Again a return code indicates if the creation is successful. The actual vertex index is returned in the first argument. The final line makes a tentacle in hyperedge hej1 that connects to vertex vtx1. If an error occurs here it may be that there is no room in the tables, or that a connection to a nonexistent hyperedge or hypergraph was attempted.

A quicker way of creating this hypergraph uses a different method:

```
#include "hypergraph.h"
RealBasicHypergraph<10,10,10,10> hg1;
unsigned int hej1;
hej1=hg1.makeHyperedge(1);
```

This example shows that the quick way of creating a hyperedge assumes that vertex indices are tracked.

Dynamic basic hypergraphs may be constructed in roughly the same way as real basic hypergraphs. In this example, a hypergraph with three hyperedges and three vertices is created. The first hyperedge has tentacles connecting to all three vertices, the second and third hyperedges connect to two vertices. The code to construct this hypergraph is almost exactly the same as the code in the previous example:

```
#include "hypergraph. h"
DynamicBasicHypergraph hg2(10,10,10,10);
unsigned int hej1,hej2,hej3;
unsigned int vtx1,vtx2,vtx3;
Boolean rc; // boolean return code
// Make three hyperedges
rc=hg2,mkHyperedge(&hej1);
rc=hg2,mkHyperedge(&hej2);
rc=hg2,mkHyperedge(&hej3);
// Make three vertices
rc=hg2.mkVertex(&vtx1);
rc=hg2.mkVertex(&vtx2);
rc=hg2.mkVertex(&vtx3);
// Make a bunch of connections
rc=hg2.mkTentacle(hej1,vtx1);
rc=hg2.mkTentacle(hej1,vtx2);
```

```
rc=hg2.mkTentacle(hej1,vtx3);
rc=hg2.mkTentacle(hej2,vtx2);
rc=g2.mkTentacle(hej2,vtx3);
rc=hg2.mkTentacle(hej3,vtx3);
rc=g2.mkTentacle(hej3,vtx1);
```

The difference between this code and the previous code is the initial declaration of g2 in the first source line. In the first example, the sizes at compile time were needed in order to define the type of the RealBasicHypergraph. In this example, the sizes may be calculated at runtime and passed as arguments to the constructor. The second way of constructing dynamic basic hypergraphs uses the short method for making hyperedges as with real basic hypergraphs.

```
#include "hypergraph.hn
DynamicBasicHypergraph hg2(10,10,10,10);
unsigned i n t hej1,hej2,hej3;
hej1=hg2.makeHyperedge(1,2,3);
hej2=hg2.makeHyperedge(2,3);
hej3=hg2.makeHyperedge(3,1);
```

Dynamic basic hypergraphs also may be created in a third way. They may be constructed all at once using a vector of vectors. Assume a vector of vectors vv is calculated with entries that are the tentacle list for each hyperedge. If this is the case, then the following code constructs g3 which is exactly the same graph as g2:

```
#include "hypergraph. h"
std::vectortstd::vector<unsigned int>> vv;
\\ Load vv w i t h { {1,2,3}, {2,3}, {3,1) }
DynamicBasicHypergraph hg2(vv);
```

Note that this constructor for dynamic basic hypergraph, instead of taking four sizes, will compute the sizes from the specification of the graph given by the vector of vectors.

Unlike the previous examples, a ghost basic hypergraph is not an object, that is, an instance of a class and is instead, a type. That is, a ghost basic hypergraph does not refer to any data in memory at all, but stores all its data in the type system. In order to be able to do this, a complete specification of the graph at compile time is needed. Thus, ghost basic hypergraphs are created via the second method-specifying the entire graph at once. An example of a graph as g4 is as follows:

```
#include "hypergraph. h"
typedef GhostBasicHypergraph<hejc1,2,3>,hejc2,3>,hej3,1 hg3;
```

Because the ghost hypergraph is a type, it is defined via a typedef statement, not with an ordinary declaration. Since the ghost hypergraph will not consume any memory, a variable with that type is not declared. A ghost basic hypergraph may be queried, accessed, and printed like every other basic hypergraph. However, instead of generating code that accesses some memory area, the compiler will generate code returning the values that an access would have returned for other types of basic hypergraphs.

If the hyperedges need to be labeled with some signature, two things should be done. First, some signatures should be created, and second those signatures should be attached to a hyperedge. Signatures are meant to be immutable data items. Once they are created and assigned, they should not be modified. To attach dynamic data to hyperedges or vertices one should use attributed or carrier hypergraphs.

At present, as stated earlier, there are three classes of signatures: term signatures, box signatures, and rex signatures. A term signature for a hyperedge is a pair of data items, that is a Unicode string, called the functor, and an integer arity for the hyperedge. These signatures are meant to label hyperedges in term hypergraphs.

Term hypergraphs are simply hypergraphs that encode expression trees. For example, consider the term f(a, g(b, c, d, e) ). The labeled hypergraph encoding this term is:

```
#include "hypergraph. h"
// Define term signatures.
TermSignature a(TermSignature(std::string("a"),0);
TermSignature b(TermSignature(std::string("b"),B);
TermSignature c(TermSignature(std::string("c"),0);
TermSignature d(TermSignature(std::string("d"),0);
TermSignature e(TermSignature(std::string("e"),0);
TermSignature f(TermSignature(std::string("f"),2);
TermSignature g(TermSignature(std::string("g"),4);
// Make the term hypergraph
RealBasicHypergraph<10,10,10,10,Labeled<TermSignature hg4;
hg4.label(hg4.makeHyperedge(1)),a);
hg4.label(hg4.makeHyperedge(2),b);
hg4.label(hg4.makeHyperedge(3),c);
hg4.label(hg4.makeHyperedge(4),d);
hg4.label(hg4.makeHyperedge(5),e);
hg4.label(hg4.makeHyperedge(7,3,4,5),g);
unsigned i n t termhej(hg4.~akeHyperedge(6,1,7));
hg4.label(termhej,f);
```

In this example, seven TermSignatures are created, one for each atom or functor in the term. All the atoms correspond to functors with arity o. The two functors f and g have arity 2 and 4 respectively. The term hypergraph is made by creating a series of labeled hyperedges. Each hyperedge is manufactured as previously described and then labeled by a term signature. The last two lines provide an index to the top level hyperedge which is then labeled.

Signatures in labeled hypergraphs are immutable data that label hyperedges. When dynamic data is to be attached to hyperedges, features in an attributed basic hypergraph are used. A feature is any kind of data that hangs onto a hyperedge. For example, a floating point vector is attached to each hyperedge as follows:

```
#include "hypergraph.h"
typedef Vectortfloat> Vfloat;
Vfloat vecl;
for(i=0;it<10;++i)vecl[i]=i;
RealBasicHypergraphtl0,10,10,10,AttributedtVfloat>> hg5;
unsigned int hejl(hg5.rnakeHyperedge(1));
hg5.setFeature(hejl,vecl);
```

In this example a new template argument, Attributed<Vfloat>, indicates a Vfloat feature should be attached to each hyperedge in the hypergraph hg1. The hyperedge hej1 is created in the next line and then its feature is set to vec1 in the last line.

Attaching data to vertices can he done by creating carrier hypergraphs. In a carrier hypergraph, a vertex has a dataflow object attached to it. This is done in a manner similar to attributed hypergraphs. A queue of floats is attached to each vertex as follows:

```
#include "hypergraph.hn
typedef Queue<float> FloatQ;
RealBasicHypergraph<10,10,10,10,Carrier<FloatQ>> hg6;
unsigned int vtxl;
unsigned in retCode(hg6.mkVertex(&vtxl));
hg6.makeHyperedge(vtxl);
FloatQ ql;
hg5.setDataflow(vtxl,ql);
```

Here the extra template argument indicates that each hypergraph vertex carries a dataflow which is a queue of floats.

There are a number of methods to support access of basic hypergraphs. Each access method has a virtual version and an inline version. The library offers a virtual version so that access across all basic hypergraphs may have a common interface. The library offers an inline version so that when the kind of basic hypergraph is known at compile time, an efficient inline version is available.

A program may be written that will take any basic hypergraph and print out all the hyperedges connected only to a single vertex, that is print out degree 1 hyperedges along with the unique vertex they connect to.

```
void printUnitalHyperedges(AbBasicHypergraph hg) { // hg is any basic hypergraph
for(unsigned int hej=1;hejlhg.nHej( );++hej) { // for all hyperedges
if(hg.hejDegree(hej)==1){ // if the hyperedge is unital
unsigned int vtx;
vtx=hg.vtx(hej,1); // find the vertex
std::cout<<"Unital hyperedge "<<hej<<" connected
t o vertex "<<vtx<<endl;
}
}
```

This fuinction takes in an abstract basic hypergraph, AbBasicHypergraph, which is the base class for all basic hypergraphs. Thus it will work for all real, dynamic, and ghost basic hypergraphs. In this example a number of access methods are used. These access methods are all virtual functions, and thus require a vtable indirection. If the type of basic hypergraph is known statically, then one can call inline versions of these accessors. This is done by prefixing Ba, Dy or Gh to the procedure name. A hypergraph, a hyperedge or a vertex can be printed simply by sending it the print message.

Figure 4:
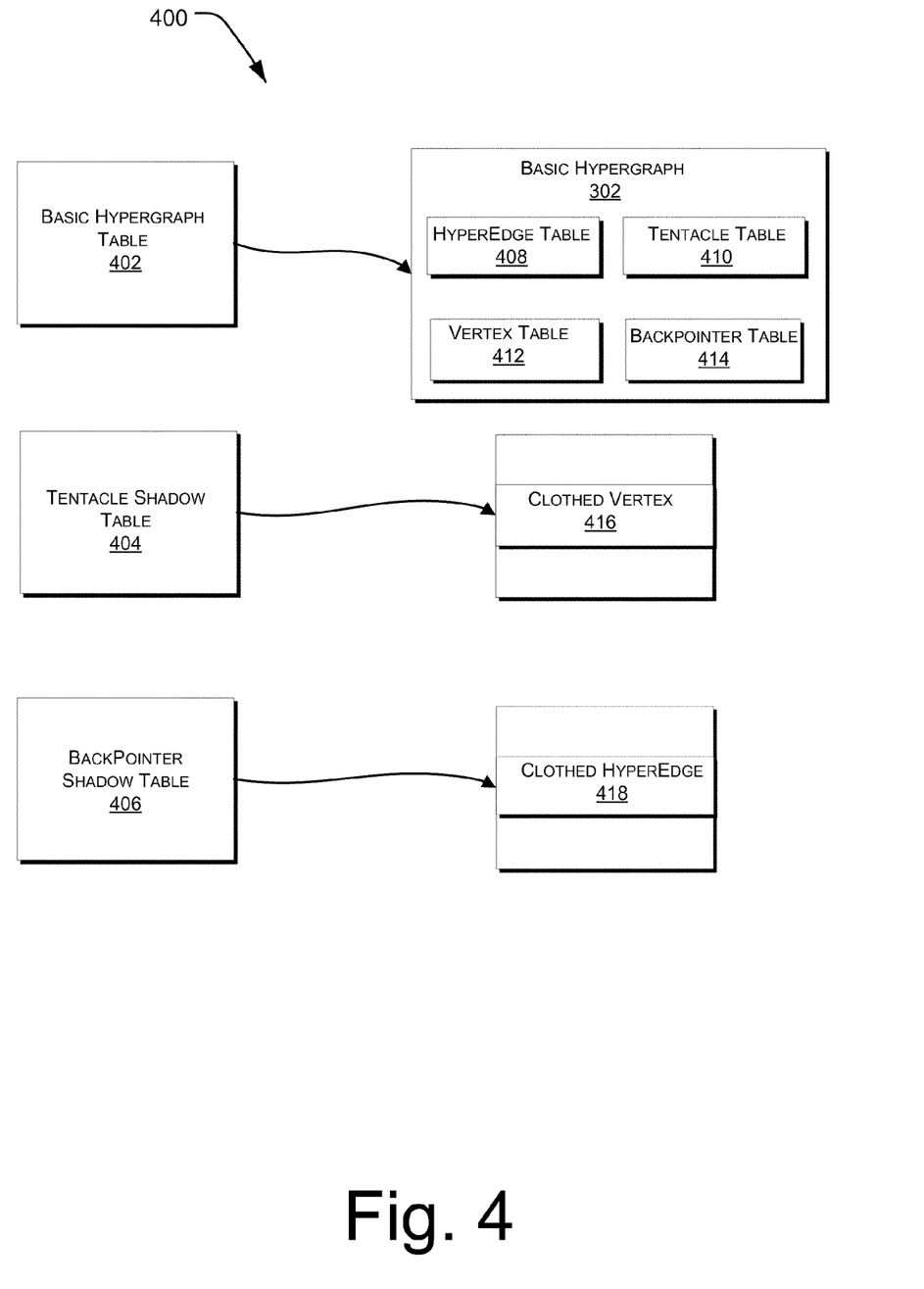
FIG. 4 depicts an illustrative example of the implementation of a shared structure hypergraph.

FIG. 4 illustrates one implementation of a structure shared hypergraph. Structure shared hypergraphs are mutable hypergraphs represented by an integer reference count, a table of pointers to basic hypergraphs and shadow tables for the tentacle and backpointer tables of each basic hypergraph. Implementation 400 in FIG. 4 illustrates the basic hypergraph table 402 pointing to a basic hypergraph 302 with hyperedge table 408, tentacle table 410, vertex table 412 and backpointer table 414. This structure represents the table of pointers to basic hypergraphs. Tentacle shadow table 404 and backpointer shadow table 406 point to a clothed vertex 416 and a clothed hyperedge 418 respectively.

A shadow table is a copy of the tentacle or backpointer table translated to hold a full index into the vertex or hyperedge tables. Shadow tables permit the topology of an embedded basic hypergraph in a structure shared hypergraph to be changed and rewritten, simply by changing the shadow tables. The basic hypergraph itself is still immutable. Basic hypergraphs can be shared among several structure shared hypergraphs. Because the shadow tables are stored in each structure shared hypergraph, different modifications are not shared. Because the shadow tables have full size index entries, a rewritten basic hypergraph need not point into itself but can point outside itself and into any other hypergraph.

Abstract hyperedges and vertices come in two varieties. A bare hyperedge or vertex is simply an integer index into the appropriate table. It is used when the relevant basic hypergraph is clear. A clothed hyperedge 416 or vertex 418 is a (basic hypergraph, index) pair that identifies to which basic hypergraph the bare hyperedge or vertex belongs. Note that concrete hyperedges and vertices may represent abstract prototypes in one of three ways: large, small or tiny. Although these types are just value types, they should be treated as objects. This makes it easier to get and set attributes and modify connectivity.

Reference count may also be used. The basic hypergraphs are cyclic only in themselves. Signatures, features and dataflows only point to POD data without pointers, so they are acyclic. Thus basic hypergraphs can be reference counted. If a cycle in a structure shared hypergraph needs to be introduced, the cycle is collapsed by merging all the basic hypergraphs in the cycle into a larger single basic hypergraph, which can then be reference counted.

Fundamental operations on structure shared hypergraphs are constructor/destructor, embedding a basic hypergraph, redirecting a tentacle in some basic hypergraph to point elsewhere, graphing traversal operations, cloning an SSHypergraph to a larger representation and collapsing a structure shared subgraph into a basic graph to prevent cycles in shared structure hypergraphs.

Advanced operations of structure shared hypergraphs are hyperedge replacement, hypergraph grammar generation, hypergraph parsing and hypergraph rewriting. Hyperedge replacement means replacing a hyperedge via a replacement rule. Hypergraph grammar generation means transitive closure of a hyperedge replacement. Hypergraph parsing means drawing boxes around subgraphs to run hypergraph grammar generation backwards. Hypergraph rewriting means rewriting a hypergraph via a set of production rules. The rule set is a pair of hypergraph grammars (g1,g2), where g1 is used to parse a hypergraph to recognize a left hand side, and g2 is used to generate its replacement.

All the advanced operations on hypergraphs can be implemented as variations of hyperedge merging, which corresponds roughly to the resolution operation in clausal theorem proving. Hyperedge merging is a very simple topological operation. Two edges, which may have additional compatibility conditions imposed by features and signatures, of the same degree are merged by collapsing a vertex incident with a tentacle of one edge with the vertex incident with the corresponding tentacle of the other edge and deleting both original hyperedges. Collapsing vertices simply unifies the tentacles tied to them.

One issue to be solved by the merging process is how to represent the collapsed vertices and maintain their degrees. The structure shared representation needs to maintain the backpointer shadow tables to handle collapses. They are arranged so that entries in the backpointer shadow table 406 are either empty, tentacle pointers, or pointers to other backpointer records. Backpointer records are arranged to form a cycle of backpointers. Merging hyperedges frees up one or more backpointer entries, allowing a pointer to other backpointer records. Each entry of the backpointer shadow table 406 has a local degree and global degree. The local degree records the number of tentacle backpointers in the entry and the global degree records the number of tentacle backpointers for the entire cycle of records. If the local degree equals the global degree then the vertex has not been merged. If the local degree is less than the global degree then the vertex has not been merged. If the local degree is less than the global degree, then the entry after the last tentacle backpointer points to the next record in the cycle. When two hyperedges are to be merged, the vertices of corresponding tentacles are merged. This operation begins when backpointers to the original tentacles are erased. The "holes" are then filled by the last backpointers in the record. If no continuation pointer to another record exists, then create a continuation pointer to each record in the space left by last backpointers. Swap the continuation pointers of the two records to be merged and complete the operation by updating the local and global degrees of the two edges. These operations result in one single large cycle of backpointer entries.

Structure shared hypergraphs are mutable hypergraphs that contain basic hypergraphs as elements. Because basic hypergraphs have immutable connectivity and signatures, they may be freely shared among all structure shared-hypergraphs. One must be careful, however, when there are features or dataflows attached to a basic hypergraph. Sharing such hypergraphs among different structure shared hypergraphs creates data dependencies that make it difficult to process those structure shared hypergraphs independently. One must be very careful in multithreaded code when such shared data exists. One must either lock access to the data or make independent copies of that data. The latter is preferred for parallelism.

Structure shared hypergraphs have two categories of operations that they may perform. There are a set of low level operations that enable any computation to be done on them. There is also a set of high level operations that enable complex computations on graphs to be stated at a powerful abstract level.

There are three sizes of structure shared hypergraphs: small, medium, and large. The size of the hypergraph does not actually refer to the size of the entire hypergraph, but rather the maximum size (real or dynamic) basic hypergraph that may be held in the structure shared hypergraph. Small shared structure hypergraphs may only hold basic hypergraphs whose vertex and hyperedge count are each less than 255. Medium shared structure hypergraphs may hold either small or medium size basic hypergraphs with analogous sizes less than 65,535. Large shared structure hypergraphs may hold any size hypergraph.

The low level operations for structure shared hypergraphs are used to create, assemble, and modify the hypergraph.

An example using low level operations to create structure shared hypergraphs is shown below:

```
SmSSHypergrapht6> ssHg;
    int bhg1=ssHg.addHypergraph(hg1);
    int bhg2=ssHg.addHypergraph(hg2);
    int bhg3=ssHg,addHypergraph(hg3);
    int bhg4=ssHg,addHypergraph(hg4);
    int bhg5=ssHg,addHypergraph(hg5);
    int bhg6=ssHg.addHypergraph(hg6);
```

This example creates a small shared structure hypergraph containing the basic hypergraphs defined in the previous examples. Notice that a shared structure hypergraph may hold basic hypergraphs of any kind: real, dynamic or ghost and may hold attributed, labeled, and/or carrier flavored basics. The routine addHypergraph returns an integer index indicating which entry in the basic hypergraph table the hypergraph has been assigned. If there is a problem with adding a hypergraph, a non positive integer is returned. Zero indicates general failure, negative values are specific failure return codes.

Basic hypergraphs can be deleted and recovered with these two methods:

```
ssHg.deleteHypergraph(bhg6);
    AbBasicHypergrapht pHg7=ssHg.basicHypergraph(bhg5);
```

The first line deletes hg6 from the hypergraph, and the second line returns a pointer to bhg.

Accessing structure shared hypergraphs involves the introduction of two new generic datatypes, a ClothedHyperedge and a ClothedVertex. When dealing only with basic hypergraphs, these datatypes were not needed because only one graph was involved. Thus bare hyperedges and vertices could be used which were just unsigned ints indicating the index of the hyperedge or vertex in the appropriate table. Because structure shared hypergraphs contain many basic hypergraphs, which when rewritten may point into each other, a hyperedge should be represented as a structure that not only specifies an index into a particular table, but also which basic hypergraph's tables should be used. These are the clothed structures: they are basically pairs (basic hypergraph, hyperedge) or (basic hypergraph, vertex).

```
ClothedHyperedge<?> cHejl(bhg2,l);
    ClothedVertex<?> cVtxl(bhg2,l);
    int hldeg = ssHg.degree(cHej1);
    int vldeg = ssHg.degree(cVtx1);
    ClothedVertex<?> cVtx2 = ssHg.vtx(cHejl,3);
    ClothedHyperedge<?> cHej2 = ssHg.hej(cVtx1,l);
```

In this example, a clothed hyperedge and vertex is defined in the first two lines. The next two lines interrogate the current degrees of hyperedge and vertex. The fifth line returns the clothed vertex pointed to by the third tentacle of cHej1. The final line returns the first clothedhyperedge pointing to cVtx1.

The clothed vertices can be printed as well as the entire hypergraph as follows:

```
ssHg.print(cHej1); // print the clothed hyperedge
    ssHg.print(cVtx1); // print the clothed vertex
    ssHg.print( ) ; // print the whole hypergraph.
```

Up to this point, basic hypergraphs have been inserted into shared structure hypergraphs, but their topology has not been edited. This is done via the hyperedge merging operation. Hyperedge merging is the fundamental topology editing operation for shared structure hypergraphs. All the other higher level topology editing operations are based on using it in various ways. Hyperedge merging proceeds in three steps. The first step is to test that the two hyperedges to be merged are compatible. Second, the vertices connected by the corresponding tentacles of each hyperedge are merged. Finally, the two hyperedges are deleted. Testing for compatibility varies depending on the type of the hyperedges to be merged. For example, plain unlabeled, unattributed hyperedges are compatible if they have the same number of tentacles. If they are labeled, they have to have compatible signatures.

An application may define a new test for its signature by defining the virtual method signature. In addition, the hyperedge test method may be overridden by subclassing ClothedHyperedge and defining the testMerge(ClothedHyperedge h)

method. The second operation and third operations are to merge vertices and delete the original hyperedges.

A code example of merging two hyperedges is ssHg.merge (cHej1,cHej2); // Merge two hyperedges, where the previous example code defines the variables.

Because shared structure hypergraphs are mutable and may be edited topologically, accessing them is less efficient than accessing basic hypergraphs. If there is a lot of editing and little access, this does not cause a problem. However, it may be that the application will go through a phase of heavy editing, then a phase of heavy accessing. In these cases it may be advantageous to clone the shared structured hypergraph into a basic hypergraph for access. The resulting basic hypergraph is of necessity a dynamic basic hypergraph. In cases where the application needs to mix editing topology with access and there is no clear phase separating the two, it doesn't make sense to clone.

The call for cloning is straightforward: DynamicBasicHypergraph dbh1 (ssHg). This constucts a new DynamicBasicHypergraph that is a clone of the structure shared hypergraph ssHg.

The high level operations that one may perform on structure shared hypergraphs are those most likely to be used by an application. The basic editing operation, hyperedge merging, is most likely to be useful when an application needs to define a new high level operation not covered by the operations presented here. However, these operations have a very wide range of action, so it should be relatively rare for an application to need new high level operations.

The hyperedge replacement operation replaces a single hyperedge with a hypergraph. Specifying the replacement operation involves a (context free) replacement rule. A replacement rule is a hypergraph where the first hyperedge is called the head of the rule and the rest of the hypergraph is called the body of the rule. Hyperedge replacement rules are drawn a bit differently than usual, the body of the rule is drawn inside the head of the rule.

Because elements may become incompatible after merging is started, one cannot just test for merging recursively all the way down before merging. The testing is done by conducting the whole recursive merging and then restoring the original state if the merging cannot be completed. This is done by trailing the merge operations. The overwrites and clears are fine, but the swap operations have to be tracked. For ordinary term unification, variables are substituted, that is the terms are not rewritten. Unification under arbitrary term rewriting is undecidable. These terms are higher order variables, that is, variables where the arity/multiplicity is fixed and so should be typed.

Figure 5:
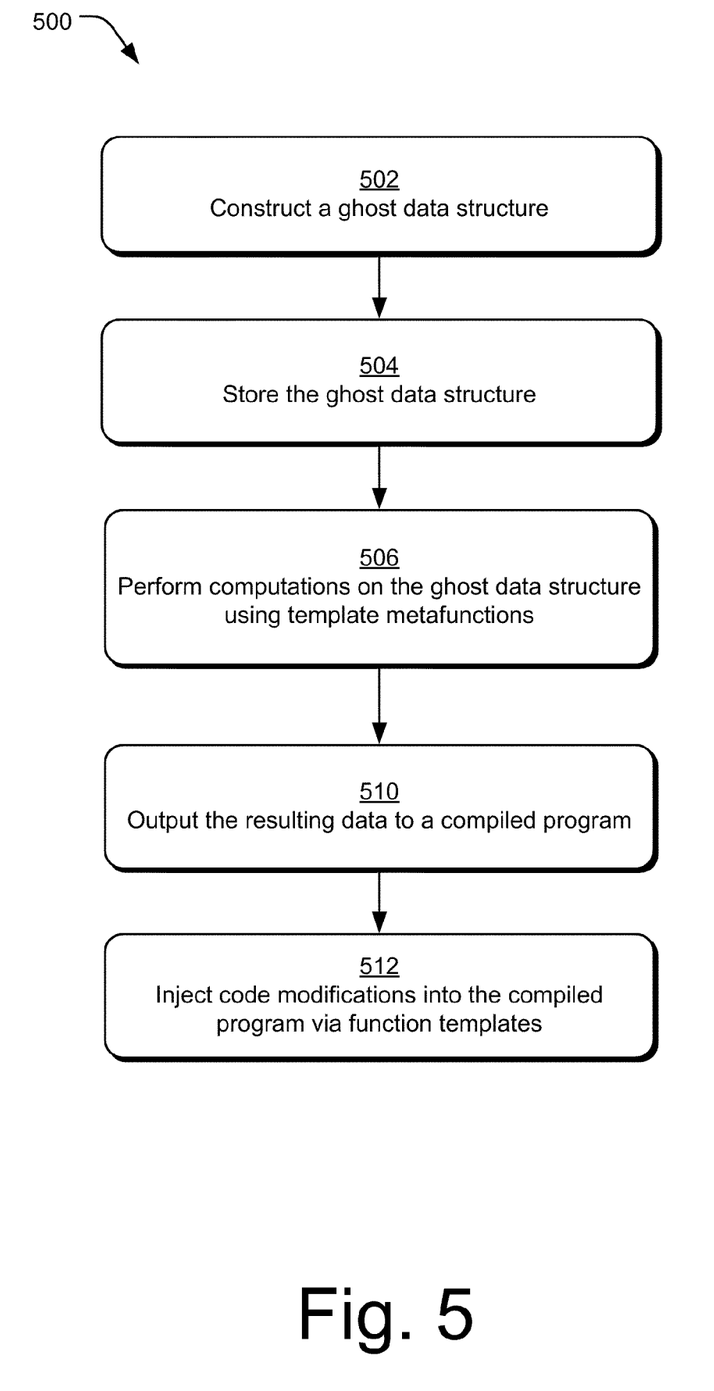
FIG. 5 depicts a flow diagram depicting a ghosting technique used in the hypergraph implementation architecture of FIG. 1.

FIG. 5 shows a method for conducting the ghosting technique. The method 500 begins with constructing a ghost data structure in operation 502. The ghost data structure is stored in operation 504. Computations are performed on the ghost data structure using template metafunctions in operation 506. The resulting data is outputted to a compiled program in operation 510 and code modifications are injected into the compiled program via function templates in operation 502.

The ghosting technique assists in making the application perform better. Since the tentacle and backpointer tables in basic hypergraphs are only used to initialize the shadow tables, these tables can be ghosted. Ghosting is now more fully described. When the tentacle and backpointer tables are known statically, a copy of the tables does not need to be kept at runtime. The tables may be stored inside the type system at compile time. The generic template mechanism is then used to initialize the shadow tables. The tentacle and backpointer tables are called ghost tables because they do not exist at runtime. Vertex and hyperedge tables may also be ghosted.

Ghosting may be used on most basic hypergraphs. However, there are times when ghosting cannot be used. For example, when a basic graph is built at runtime, say by reading some set of input commands, the tables need to be stored in real memory. The template library should work the same whether the hypergraphs are ghosted or not, or whatever the size of the tables.

Utilization of the ghosting technique for hypergraph implementation has been described, however, the ghosting technique is also very amenable to C++ metaprogramming. When a scalar constant is known at compile time, it can be declared with the const qualifier and initialized with its static value. In many cases, this effectively removes any storage allocation for the constant. Furthermore, when such compile time fixed values appear in const expressions, the compiler is able to execute them and replace these expressions with fixed values as well. It would be desirable if C++ compilers could do this for larger aggregates of data, however, when the const datum is not a simple scalar, struct, or array, there is no widely known technique that achieves the same compile-time savings. The potential memory savings would be considerable in the case of data structures since they're generally much bigger than simple scalars. There are significant performance implications when using-data structures that do not consume runtime memory since these can improve the data residency characteristics of caches. It is well known that increasing residency performance yields direct gains in overall code performance. The advantages for compile time calculation of expressions with static scalars are also potentially magnified if const could be applied to data structures. Typically much larger blocks of computation are associated with data structures than with simple scalars. These could all be moved into compile time. Such hypothetical static data structures are called ghost data structures in this document. The programming technique that replaces runtime data with compile time data is called ghosting in this document. Furthermore, ghosting can be achieved using existing modern C++ compilers.

In ordinary C++, the const qualifier ghosts simple scalars just fine. Also, arrays and structs, may be declared consts. However, constructing more complex data structures usually requires tying them together with pointers. But pointers-even const* pointers-need a memorytarget. Such locations may also be targets of non-const* pointers, so memory must be allocated to the object. Without the ability to point to ghosts, only very simple aggregates may be ghosted with the const qualifier. In addition, const expressions are very primitive in C++. They may only evaluate to integral or enum constants. Functions, class objects, pointers, and references can only be used as operands of the sire of operator. Thus in most compilers, it is possible to do very limited calculations just using const expressions.

A modern C++ compiler that has an up to date template facility. As for syntax, it is assumed that the "angle bracket hack" has been implemented so a space between closing brackets in template statements does not need to be inserted. If ghosting is to be a viable technique useful in a wide range of situations, a rich set of data structures and compile time expressions in C++ needs to be facilitated. This requires transcending the limitations of the const mechanism. Fortunately, C++ has a powerful compile-time computation capability through its template facility. Construction and storage of ghost data structures in the C++ type system, manipulation and performance of arbitrary computations on these ghosts using template metafunctions, and outputting the resulting data and injecting the code modifications into the compiled program via a certain kind of function template called portals are described below.

The approach to template metaprogramming described is different from the Boost Metaprogramming Library. In that approach, data structures, iterators, and-other mechanisms are provided as abstractions by the library to support a limited style of imperative programming. However, as has been noted many times, the template system presents an inherently functional programming language. Imperative libraries, like Boost MPL must go to great lengths to provide an imperative abstraction. This makes the resulting code very far removed from the initial specification and causes problems in debugging, inadvertent inefficiencies due to abstraction/implementation mismatch, and quirky limitations to the foreign programming abstraction, that is, the imperative abstraction. For these reasons, a very simple and straightforward adaptation of a widely familiar class of functional programming languages (lisp-inspired languages) is adopted. By doing this, there is a natural translation of lisp code and data into C++ templates which requires minimal to no library support.

Lisp data is composed of atoms, integers, floats, and s-expressions. In the C++ template system all but one of these, that is templates, cannot handle floats. An atom is simply an indivisible uniquely identifiable item. Some examples of atoms are as follows:

```
// atoms
struct tt {};
struct ff {};
struct nil {};
```

Atoms are just type names, in this case of empty structs. Since it is desirable that ghost data structures disappear at runtime, all of them must be empty structs. The template system can handle integers directly, but in order to make all the ghost items valid types, they are wrapped into an empty struct as well.

```
// Wrap ints into an atomic type.
templatetint N> struct intT{
enum {val = N};
};
```

This template will wrap an integer N into a type int.T<N>, which is an empty struct. The integer value may be recovered by accessing the local enum with the expression intT<N>::val. The final class of lisp data structures, s-expressions, are represented as empty structs as well.

```
#define - typename
// cons pair
template<TI,-T2> struct cons{
typedef T1 car;
typedef T2 cdr;
typedef const<T1,T2> val;
}
```

In this snippet of code, the token "-" to stand for the token "typename" is defined. This is just to fix the wrong default parsing choice the C++ compiler makes when expanding qualified identifiers. The "typename" keyword was introduced to force the correct decision, which is abbreviated to "_" because it appears so often.

Lisp s-expressions are either atoms—which have already been defined—or a cons-pair of s-expressions. The way cons pairs are represented is via the generic type cons<> parameterized by two ghost types T1 and T2. The generic type is an empty struct, like all ghosts, but defines three embedded types. The first two types allow recovery of the items of the cons pair, the third type is the value of the cons pair. Type defs are used as well as enums extensively to define embedded types and integer values for each type. That is; a typedef binds ghost names to ghost values. Like the Boost Metaprogramming Library, a common embedded type, val, is used to hold the value of the function. Thus cons<> is both a type constructor and a dyadic type metafunction that returns the constructed type. The final kind of lisp data organization is the property list. It is a straightforward application of trait templates to bind properties to atomic ghost types.

Functions are defined by template metafunctions. These are templates that may take any number of ghost types and have an embedded typedef which defines a val type. In order to evaluate the function, its value type is accessed. The factorial fuinction is perhaps the quintessential example

```
// factorial (as an example)
template<_> struct fac;
template<> struct fac<intT<0>>{
enum{v=1};
typedef intT<v> val;
};
Template<int n> struct factintT<n>>{
enum{nl=n-1,
v=n*fac<intT<nl>>::v
};
typedef intT<v> val;
};
```

This function is defined with a template declaration and two template specializations. The first line simply declares the fac metafunction to be monadic, taking a single ghost value. It also establishes the primary template. The next two template definitions define the factorial by cases. Traditional lisp definitions of factorial use a conditional. While it is certainly possible to define conditionals with templates, when using C++ templates it is natural to use pattern matching to define functions by cases. Pattern matching is simple because it is naturally provided by C++ templates through the specialization mechanism. Reversing the order of the two specializations would have no effect. The C++ template specialization selection mechanism will always find the most special template to invoke. The specialization rules define a partial order on template arguments in order to determine the most special parameters. It is an error to encounter incomparable specialized template arguments. A definition of conditional is provided in the ghost template library. The first template definition is a full specialization (instantiation) of the primary template. It simply handles the base case of the factorial.

Two values are defined within this case. The first, v, is an integer value of the factorial. The second, val, is the atomic type containing the integer value. The second definition is a partial specialization of the primarily template to handle the induction case of f ac. Notice that the template has an integer parameter n. Each pattern that appears in the specialized template may or may not have free type variables appearing in it. If free variables appear, they must be included as template parameters in the partial specialization. They serve as a kind of "environment" for the patterns. C++ does not require that the parameters of a specialized template definition correspond to the general template that is being specialized.

As part of the factorial definition, two new integer variables, n1 and v, are defined through enum declarations. n1 is a decrement of the input and v is the recursive calculation of factorial. When the value v is calculated, fac is called recursively in two steps. First the type fac<intT<n1>> is mentioned, and then it is evaluated by accessing the integer enum value v. This defines v as the desired integer factorial value. This resulting integer value is packed into an atomic type and returned as a the val of fac <> in the typedef statement.

Higher order functions are also straightforward using template template parameters.

```
// map
Template<template<->class, -> struct map;
Template<template<->class F> struct map<F,nil> {typedef nil val;};
Template<template<->class F,- X,- Y> struct map<F,cons<X,Y>> { '
typedef - F<X>::val FX;
typedef - cons<FX,- map<F,Y>::val> val;
};
```

In this example, the primary template shows that map has two parameters. The first parameter is a template metafunction and the second parameter is a list. The second line is the base case and defines the map of a metafunction F onto nil to be nil. The third line pattern matches the map of F onto a cons pair. F is first applied to the car of the cons pair to yield the ghost type FX. The value of the map is then defined to be FX consed to the value of mapping F on the cdr of the list. With this example it is obvious how to proceed to use templates as a full-fledged functional programming language.

By now it should be clear that any data structure can be represented and perform any computation completely at compile time using the functional programming paradigm outlined above. This lets the arbitrary ghost data structures be defined as well as the arbitrarily complex operations on them, all in the type system at compile-time. The next step is defining a way to transfer the results of ghost type computations to runtime data and code in the real world.

This is done by defining portals, which are simply a kind of function template. Data portals are now addressed. The way of transferring data from the ghost world into the real world is to define a function template for the initializer of a real world data structure that takes a ghost world datatype as its argument. An example is as follows:

```
// Template function portal.
// Fill a real memory array arr from a ghostlist L.
template<- L,-T> inline void portal(L ghost,T* const arr){
static L: :cdr ghostl;
*arr=L: :car: :val;
portal(ghostl,arr+1);
};
template<- T>inline void portal(nil,T* const arr){};
```

This example portal takes two arguments. The first argument is a ghost list and the second argument is a pointer to an array. This function is declared as an inline so that it generates top level code. The body of the template has three lines. The first line defines a static ghost variable ghostl holding the tail of the list. Since a ghost variable never has a runtime representation and thus no value, it can be declared static with no problem. C++ has a rule that even empty objects need to be allocated at least one word (except when they are part of a larger object). By making that variable static, this overhead is incurred only once.

The next line accesses the first item of the ghost list. It is assumed that the list is not nested, so that each item of the list is an atomic integer type int T <>. The second line initializes a real memory location with the value held in intT <>. The last line is a recursive call with the rest of the list and a pointer to the rest of the array. The second specialization of portal just handles the base case, that is, empty lists generate no data. From this example it should be clear how one can approach writing a data portal. There is at least one ghost argument for the template function usually defined inline. The function traverses the ghost data structure, constructing nodes and transferring integer data as it does so.

Code portals are known in the template metaprogramming community and are known as expression templates. Code portals are simply function templates in which one argument is a ghost. This ghost can be used to control what code is generated. In this example, a simple function that traverses a ghost tree of possible actions in a depth first manner is made. It then performs the actions at the leaves, generating a single linear list of actions.

```
// Code portal example.
// First define a set of ghost actions.
struct actionA { };
struct actionB { };
struct actionC { };
struct actionD { };
// define code portal that traverses tree of actions.
template<- T> inline void depthFirst(T);
template<- T1,- T2> inline void depthFirst(cons<T1,T2>-ghost){ ..
static T1 g1; static T2 g2;
depthFirst(g1);
depthFirst(g2);
}
template<> inline void depthFirst(actionA ghost) {std::cout<<"doing
actionA"<<std::endl;}
template<> inline void depthFirst(actionB ghost) {std::cout<<"doing
actionB"<<std::endl;}
Template<> inline void depthFirst(actionC ghost) {std::cout<<"doing
actionC"<<std::endl;}
template<> inline void depthFirst(actionD ghost) {std::cout<<"doing
actionD<<std: :endl;} ,
```

In this example, a simple code portal is made that traverses a tree of actions in depth first manner. Generating code by traversing a data structure is a familiar organization for code generators in compilers. Four ghost atoms are defined that represent atomic actions to be generated. Then the primary template is declared which is a function template with only one ghost parameter. The next line defines the depth first traversal of the tree, and the remaining lines perform leaf actions. Using the code portal is shown as follows.

```
cons<cons<actionA,actionB>,
constcons<actionA,actionC>,
cons<actionA,actionD>>> ghostA;
depthFirst(ghostA);
```

In this example, the ghost tree of actions is explicitly constructed. In a real application, this ghost tree would have been computed. The next line actually invokes the code portal. When-this code portal is executed it results in the following output.

doing actionA
doing actionB
doing actionC
doing actionD
Conclusion

The description herein describes a hypergraph implementation system. The hypergraph implementation system provides for a hypergraph template library that contains many hypergraphs and many bulk data files. The hypergraphs allow the developer to program an application such that the pointers to files are contained in the memory cache. The hypergraphs consist of hyperedges and vertices residing in tables of indices that point into each other in a flat organization. The bulk data is hung directly off hyperedges and vertices via a set of features. Thus, all the relationships among objects are contained within the hypergraphs and all the bulk data such as audio, large tables, geometry and images are directly tied to hyperedges or vertices with one link. These pointers are local indexes that are small in size that fit into fast memory caches, precluding the need to follow general pointers into main memory and mitigating cache misses.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
under control of a processor configured with specific executable instructions to perform acts comprising:
a hypergraph template library comprising:
a plurality of bulk data areas forming at least a portion of an application configured for execution on a multi-core computing device, and
a plurality of hypergraphs that include:
a plurality of pointers such that the multi-core computing device that runs the application accesses a second processor, the second processor including cache memory and main memory, wherein the application captures the plurality of pointers in the cache memory and captures a plurality of data structures in the main memory; and
a basic hypergraph that comprises a hyperedge table, a tentacle table, a vertex table and a backpointer table, wherein the tentacle table and the backpointer table are ghosted to form one of the plurality of data structures such that when the tentacle table and the backpointer table are statically known, the tentacle table and the backpointer table are not stored in memory at runtime and only the known value is stored in memory at runtime.

2. The method of claim 1, wherein the plurality of hypergraphs are located in a top level of a programming code and the top level is configured to provide a single pointer to the plurality of data structures.

3. The method of claim 1, wherein the plurality of hypergraphs includes a structure shared hypergraph that comprises a plurality of basic hypergraphs and a plurality of shadow tables.

4. The method of claim 1, wherein each of the plurality of pointers are eight bits or less in size.

5. The method of claim 1, wherein the plurality of hypergraphs have labeled hyperedges that include at least one of a term signature, a box signature, or a rex signature.

6. The method of claim 1 wherein the plurality of hypergraphs comprise at least one of attributed hyperedges or carrier vertices.

7. A system for programming an application configured for execution on a multi-core computing device, comprising:
a processor;
a memory;
a hypergraph template library, stored in the memory and executable by the processor, comprising:
a plurality of hypergraphs; and
a plurality of bulk data areas forming at least a portion of the application configured for execution on the multi-core computing device, the plurality of hypergraphs including:
a plurality of pointers such that the multi-core computing device that runs the application accesses a second processor, the second processor including cache memory and main memory, the application capturing the plurality of pointers in the cache memory and capturing a plurality of data structures in the main memory; and
a basic hypergraph that comprises a hyperedge table, a tentacle table, a vertex table and a backpointer table, wherein the tentacle table and the backpointer table are ghosted to form one of the plurality of data structures such that if the tentacle table and the backpointer table are statically known, the tentacle table and the backpointer table are not stored in memory at runtime and only the known value is stored in memory at runtime.

8. The system of claim 7, wherein the plurality of hypergraphs are located in a top level of a programming code and the top level is configured to provide a single pointer to the plurality of data structures.

9. The system of claim 7, wherein the plurality of hypergraphs includes a structure shared hypergraph that comprises a plurality of basic hypergraphs and a plurality of shadow tables.

10. The system of claim 7, wherein each of the plurality of pointers are eight bits or less in size.

11. The system of claim 7, wherein the hypergraph template library is used with a C or C++ programming language.

12. The system of claim 7, wherein parallel operations are used to process multiple data structures in the main memory at the same time.

13. The system of claim 7, wherein the plurality of hypergraphs have labeled hyperedges.

14. The system of claim 13, wherein the labeled hyperedges are of one of the following types: term signature, box signature or rex signature.

15. The system of claim 7 wherein the plurality of hypergraphs comprise attributed hyperedges.

16. The system of claim 7 wherein the plurality of hypergraphs comprise carrier vertices.

17. One or more computer-readable memory comprising computer-executable instructions executable on a processor, the one or more computer-readable memory embodying:
a hypergraph template library comprising:
a plurality of hypergraphs; and
a plurality of bulk data areas forming at least a portion of an application configured for execution on a multi-core computing device, the plurality of hypergraphs including:

a plurality of pointers such that the multi-core computing device that runs the application accesses a second processor, the second processor including cache memory and main memory, wherein the application captures the plurality of pointers in the cache memory and captures a plurality of data structures in the main memory; and a basic hypergraph that comprises a hyperedge table, a tentacle table, a vertex table and a backpointer table, wherein the tentacle table and the backpointer table are ghosted to form one of the plurality of data structures such that if the tentacle table and the backpointer table are statically known, the tentacle table and the backpointer table are not stored in memory at runtime and only the known value is stored in memory at runtime.

18. The one or more computer-readable memory of claim 17, wherein the plurality of hypergraphs includes a structure shared hypergraph that comprises a plurality of basic hypergraphs and a plurality of shadow tables.

19. The one or more computer-readable memory of claim 17, wherein parallel operations are used to process multiple bulk data files in the main memory at the same time.

20. The one or more computer-readable memory of claim 17, wherein each of the plurality of pointers are eight bits or less in size.

* * * * *